United States Patent
Connell et al.

(10) Patent No.: US 9,304,983 B2
(45) Date of Patent: Apr. 5, 2016

(54) METHOD AND SYSTEM FOR XFORM GENERATION AND PROCESSING APPLICATION INTEGRATION FRAMEWORK

(75) Inventors: Robert A. Connell, Kanata (CA); David Cummings, Richmond (CA); Charles M. Gobeil, Ottawa (CA); Rachna Juneja Singhal, Oakville (CA); Michael C. Mansell, Langford (CA)

(73) Assignee: International Business Machines Corporation, Armonk, NY (US)

( * ) Notice: Subject to any disclaimer, the term of this patent is extended or adjusted under 35 U.S.C. 154(b) by 2616 days.

(21) Appl. No.: 11/872,971

(22) Filed: Oct. 16, 2007

(65) Prior Publication Data

US 2009/0100087 A1    Apr. 16, 2009

(51) Int. Cl.
*G06F 17/00* (2006.01)
*G06F 17/24* (2006.01)
*G06F 17/22* (2006.01)

(52) U.S. Cl.
CPC .......... *G06F 17/243* (2013.01); *G06F 17/2247* (2013.01); *G06F 17/248* (2013.01)

(58) Field of Classification Search
CPC .............................. G06F 17/243; G06F 17/248
USPC .......................... 715/221, 222, 224, 223, 226
See application file for complete search history.

(56) References Cited

U.S. PATENT DOCUMENTS

| | | | |
|---|---|---|---|
| 6,854,085 B1 * | 2/2005 | Morse ........................... | 715/236 |
| 7,168,035 B1 * | 1/2007 | Bell .................... | G06F 17/2247 715/234 |
| 7,281,018 B1 * | 10/2007 | Begun et al. ........................... | 1/1 |
| 7,590,931 B2 * | 9/2009 | Pahl .............................. | 715/221 |
| 7,617,219 B2 * | 11/2009 | Betancourt ........... | G06F 17/243 |
| 7,761,786 B2 * | 7/2010 | Betancourt ......... | G06F 17/2725 715/221 |
| 7,774,504 B2 * | 8/2010 | Chene et al. ................... | 709/246 |
| 2001/0037496 A1 * | 11/2001 | Simonyi ........................... | 717/7 |
| 2002/0023108 A1 * | 2/2002 | Daswani et al. .............. | 707/507 |
| 2003/0217044 A1 * | 11/2003 | Zhang et al. ..................... | 707/3 |
| 2004/0003341 A1 * | 1/2004 | alSafadi et al. ............... | 715/500 |
| 2004/0103367 A1 | 5/2004 | Riss et al. | |
| 2004/0199778 A1 * | 10/2004 | Wernet et al. ................. | 713/189 |
| 2004/0230891 A1 * | 11/2004 | Pravetz et al. ................ | 715/511 |
| 2004/0243811 A1 * | 12/2004 | Frisch et al. .................. | 713/176 |
| 2005/0086581 A1 | 4/2005 | Bass et al. | |

(Continued)

OTHER PUBLICATIONS

Honkala et al. Secure Web Forms with Client-Side Signatures, Google 2005, pp. 340-351.*

(Continued)

*Primary Examiner* — Cong-Lac Huynh
(74) *Attorney, Agent, or Firm* — Ryan Lewis; Hoffman Warnick LLC (57) ABSTRACT

The present invention is a method, system and framework for generating and processing XForms documents. Utilizing the method, system and framework of the present invention, developers need only write loosely coupled components that implement the minimal application-specific interface code, and the method, system and framework coordinates the generation and processing based on a description of the form's lifecycle. It also allows developers to reuse components created for other integrations that implemented the framework. The advantage of the method, system and framework is to significantly reduce development effort to integrate XForms with a vast number of applications, while all known solutions are specific to a single integration case.

19 Claims, 4 Drawing Sheets

(56) References Cited

U.S. PATENT DOCUMENTS

| | | | |
|---|---|---|---|
| 2005/0183003 A1* | 8/2005 | Peri | 715/507 |
| 2005/0268222 A1* | 12/2005 | Cheng | 715/513 |
| 2005/0273759 A1 | 12/2005 | Lucassen et al. | |
| 2006/0036619 A1* | 2/2006 | Fuerst et al. | 707/100 |
| 2006/0130051 A1* | 6/2006 | Sanielevici | G06F 17/2247 717/171 |
| 2006/0224948 A1* | 10/2006 | Desmond et al. | 715/507 |
| 2006/0265640 A1 | 11/2006 | Albornoz et al. | |
| 2007/0112599 A1* | 5/2007 | Liu et al. | 705/2 |
| 2007/0130504 A1* | 6/2007 | Betancourt | G06F 17/2725 715/236 |
| 2007/0239749 A1* | 10/2007 | Farahbod | 707/101 |
| 2007/0288657 A1* | 12/2007 | Koskimies | H04L 67/303 709/246 |
| 2007/0288767 A1* | 12/2007 | Boyer | G06F 21/64 713/194 |
| 2007/0288854 A1* | 12/2007 | Koskimies | 715/760 |
| 2008/0010586 A1* | 1/2008 | Betancourt et al. | 715/221 |
| 2008/0028376 A1* | 1/2008 | Kostoulas et al. | 717/143 |
| 2008/0103816 A1* | 5/2008 | Kaplan et al. | 705/2 |
| 2008/0126925 A1* | 5/2008 | Haven | G06F 11/36 715/235 |
| 2008/0140803 A1* | 6/2008 | Shu et al. | 709/217 |
| 2008/0147364 A1* | 6/2008 | Davis | G06F 8/10 703/6 |
| 2008/0154824 A1* | 6/2008 | Weir et al. | 706/45 |
| 2008/0162529 A1* | 7/2008 | Stuhec | G06F 8/24 |
| 2009/0100087 A1* | 4/2009 | Connell et al. | 707/102 |
| 2009/0254971 A1* | 10/2009 | Herz et al. | 726/1 |
| 2010/0011280 A1* | 1/2010 | Cheeniyil et al. | 715/223 |
| 2010/0474974 * | 7/2010 | Brisebois et al. | 715/223 |
| 2015/0082139 A1* | 3/2015 | Carrier | G06Q 30/02 715/222 |

OTHER PUBLICATIONS

Watters et al., PDA Access to Internet Content: Focus on Forms, IEEE 2002, pp. 1-9.*

Boyer, Enterprise-level Web Form Application with XForms and XFDL, Google 2005, pp. 1-40.*

Rainer et al., Strategies for Virtual Enterprises using XForms and the Semantic Web, Google 2004, pp. 1-7.*

Stadhofer et al., Automatic Generation of E-Government Forms from Semantic Descriptions, ACM 2007, pages.*

Wolf et al., Generic XForms-based User Interface Generation for XML Schema, Google 2004, pp. 773-781.*

Cardone et al., Using XForms to Simplify Web Programming, ACM 2005, pp. 215-224.*

Lee et al., Automatic Generation of XForms Code Using DTD, IEEE 2005, pp. 1-5.*

Song et al., An Automated Generation of XForms Interfaces for Web Services, IEEE 2007, pp. 1-8.*

Lucus, "Screen Transforms," Feb. 1994, 4 pages, Pub Name: TDB, v 37, n2B p. 371-37, Doc. No. AAA94A060643, Yorktown.

* cited by examiner

METHOD AND SYSTEM FOR XFORM GENERATION AND PROCESSING APPLICATION INTEGRATION FRAMEWORK

FIELD OF THE INVENTION

The present invention relates generally to XForms documents and, more specifically, to a method, system and framework for generating and processing XForms documents.

BACKGROUND OF THE INVENTION

The problem is present art systems is that developers have no structured method to generate and process documents that use the XForms XML form standard, such as IBM's WorkPlace Forms™. The Extensible Markup Language (XML) is a general-purpose markup language. It is classified as an extensible language because it allows its users to define their own tags. Its primary purpose is to facilitate the sharing of data across different information systems, particularly via the Internet. XForms is an XML format for the specification of a data processing model for XML data and user interface(s) for the XML data, such as web forms. Forms was designed to be the next generation of HTML/XHTML forms, but is generic enough that it can also be used in a standalone manner or with presentation languages other than XHTML to describe a user interface and a set of common data manipulation tasks. There are currently no known solutions to this problem. All known integrations of XForms are custom-rolled for a specific host application.

There is a present need for a new system, method and framework for generating and processing XForms documents such that developers need only write loosely coupled components that implement the minimal application-specific interface code, and the system, method and framework should coordinate generation and processing based on a description of the form's lifecycle. It also should allow developers to reuse components created for other integrations that implemented the framework. It also should to significantly reduce development effort to integrate XForms with a vast number of applications, while all known solutions are specific to a single integration case.

BRIEF SUMMARY OF THE INVENTION

The present invention is a method, system and framework for generating and processing XForms documents. Utilizing the method, system and framework of the present invention, developers need only write loosely coupled components that implement the minimal application-specific interface code, and the method, system and framework coordinates the generation and processing based on a description of the form's lifecycle. It also allows developers to reuse components created for other integrations that implemented the framework. The advantage of the method, system and framework is to significantly reduce development effort to integrate XForms with a vast number of applications, while all known solutions are specific to a single integration case.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

The drawings are intended to depict only typical aspects of the invention, and therefore should not be considered as limiting the scope of the invention. In the drawings, like numbering represent like elements between the drawings.

DETAILED DESCRIPTION OF THE PREFERRED EMBODIMENT OF THE PRESENT INVENTION

The present invention provides a method, a system and a framework for generating and processing XForms documents.

Utilizing the system, method and framework of the present invention, developers need only write loosely coupled components that implement the minimal application-specific interface code, and the system, method and framework coordinate the generation and processing based on a description of the form's lifecycle. It also allows developers to reuse components created for other integrations that implemented the framework. The advantage of the system, method and framework is to significantly reduce development effort to integrate XForms with a vast number of applications, while all known solutions are specific to a single integration case.

As a matter of background, XForms is an XML format for the specification of a data processing model for XML data and user interface(s) for the XML data, such as web forms. XForms was designed to be the next generation of HTML/XHTML forms, but is generic enough that it can also be used in a standalone manner or with presentation languages other than XHTML to describe a user interface and a set of common data manipulation tasks. The Extensible Markup Language (XML) is a general-purpose markup language. It is classified as an extensible language because it allows its users to define their own tags. Its primary purpose is to facilitate the sharing of data across different information systems, particularly via the Internet. It is a simplified subset of the Standard Generalized Markup Language (SGML), and is designed to be relatively human-legible. By adding semantic constraints, application languages can be implemented in XML. These include XHTML, RSS, MathML, GraphML, Scalable Vector Graphics, MusicXML, and thousands of others. Moreover, XML is sometimes used as the specification language for such application languages. The Extensible HyperText Markup Language, or XHTML, is a markup language that has the same depth of expression as HTML, but also conforms to XML syntax. Whereas HTML is an application of SGML, a very flexible markup language, XHTML is an application of XML, a more restrictive subset of SGML. Because they need to be well-formed, true XHTML documents allow for automated processing to be performed using standard XML tools—unlike HTML, which requires a relatively complex, lenient, and generally custom parser. XHTML can be thought of as the intersection of HTML and XML in many respects, since it is a reformulation of HTML in XML.

Figure 2:
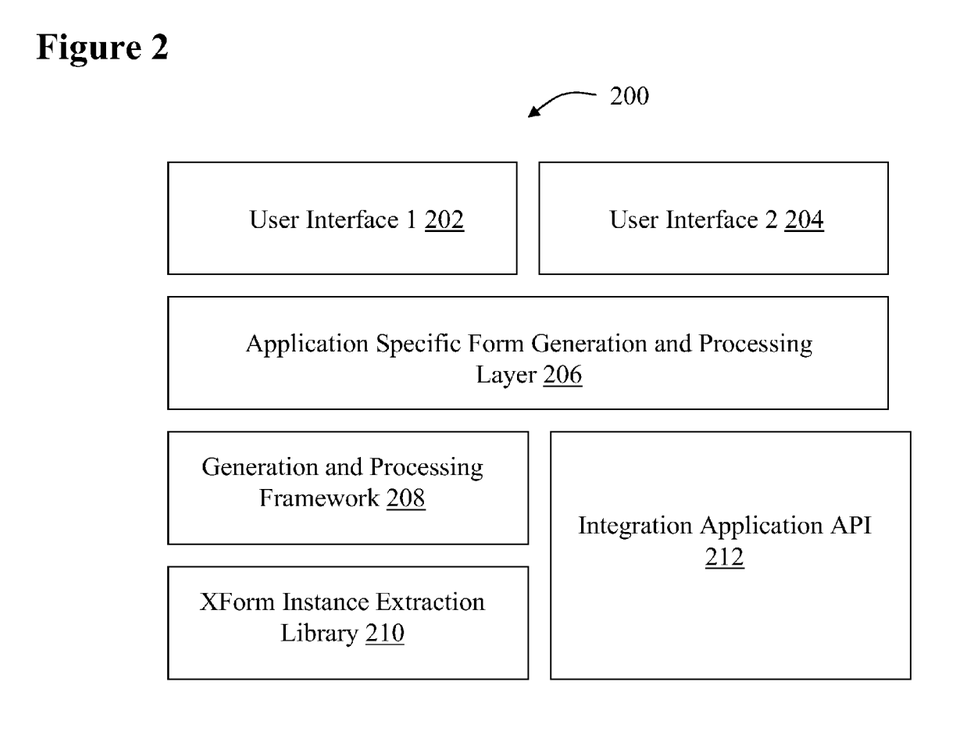
FIG. 2 illustrates the preferred embodiment of the structure of the system, method and framework of the present invention with IBM® Rational® Portfolio Manager (RPM) Web Services representing the XForms integrated application.

FIG. 2 illustrates the structure of the system, method and framework of the present invention with IBM® Rational® Portfolio Manager (RPM) Web Services representing the XForms integrated application. The IBM Rational Portfolio Manager Web Services helps businesses to align their IT and systems investments with business priorities. This alignment provides insight into the optimization of investment funding decisions, cost containment, and maximizing value across the entire portfolio. It further provides the ability to:

- Extend visibility and control over portfolios and projects;
- Enable streamlined software delivery and lifecycle management with automated best-practice processes;
- Reuse method content and process definitions;
- Improve governance through development accountability;
- Prioritize and manage IT investments in alignment with business goals;
- Improve decision-making with enhanced visibility and comprehensive dashboard decision support;
- Integrate project financial management and time and expense reporting; and
- Utilize supported operating systems: AIX, HP Unix, Sun Unix, Windows.

Figure 1A:
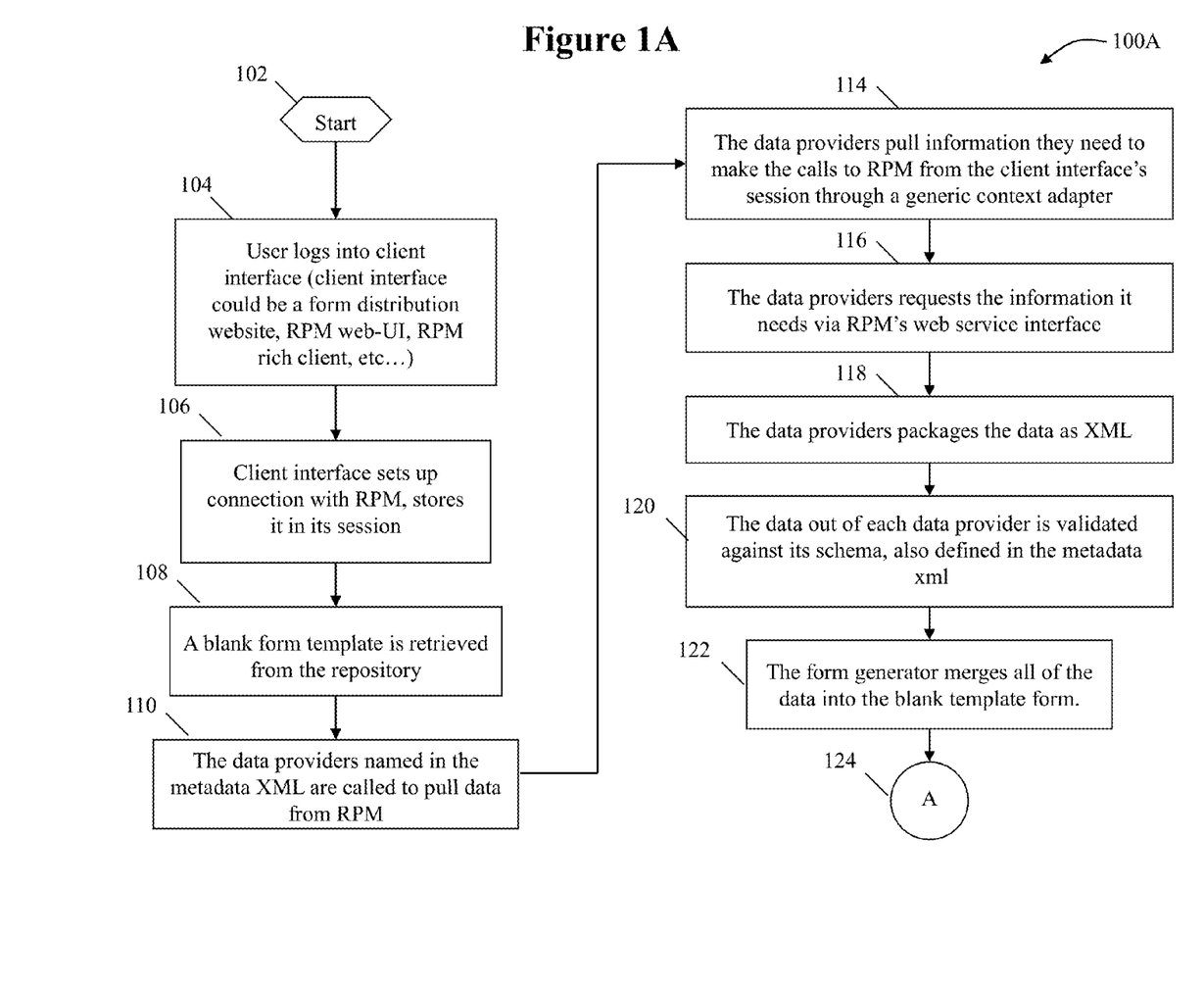
FIG. 1A depicts the first portion of the method of the present invention.
Figure 1B:
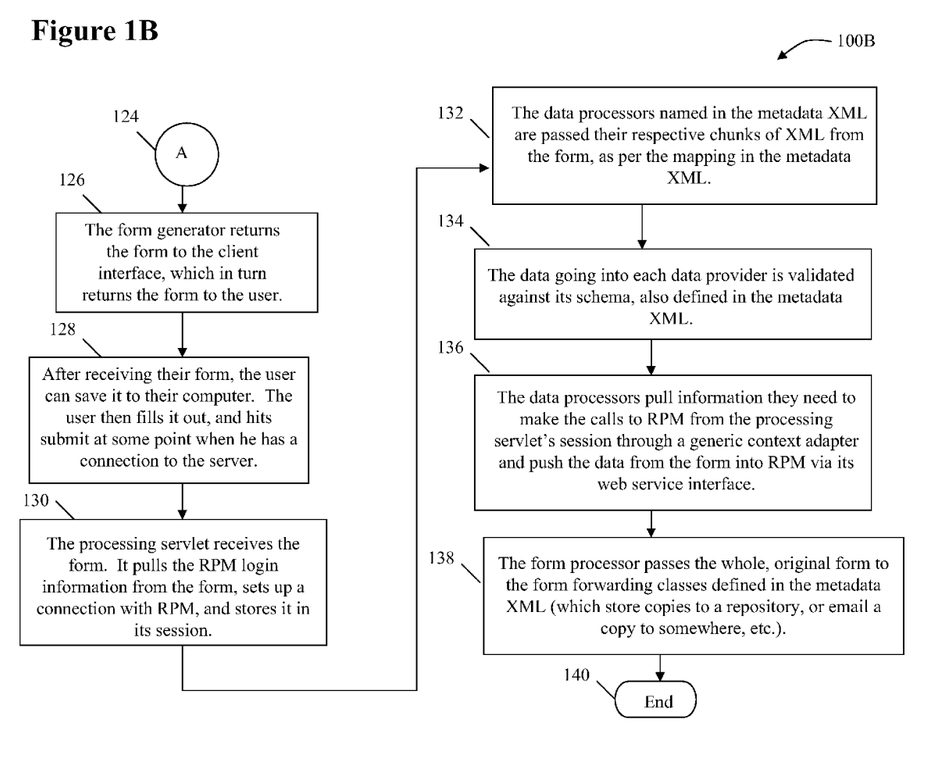
FIG. 1B depicts the second portion of the method of the present invention.

FIGS. 1A and 1B illustrate the Runtime Workflow method 100A and continued at 100B which starts at 102 and continues to Step 1 (104) where user logs into client interface (client interface could be a form distribution website, RPM web-UI, RPM rich client, etc.) Client interface sets up connection with RPM, stores it in its session.

At 106, Step 2: Form Generation occurs which is result of a user requesting a form. At 108, a blank form template is retrieved from the repository. At 110, the data providers named in the metadata XML called to pull data from RPM. The simplest definition of metadata is that it is data about data—more specifically information (data) about a particular content (data). An item of metadata may describe an individual datum (content item) or a collection of data (content items). Metadata is used to facilitate the understanding, use and management of data. The metadata required for this will vary with the type of data and context of use. At 114, the data providers pull information they need to make the calls to RPM from the client interface's session through a generic context adapter. At 116, the data providers request the information they need via RPM's web service interface; at 118, package the data as XML; at 120, the data out of each data provider is validated against its schema, also defined in the metadata XML; at 122, the form generator merges all the data into the blank template form; and the method continues at A to FIG. 1B, where, at 126, the form generator returns the form to the client interface, which in turn returns the form to the user.

At 128, Step 3 shows the User's actions with the form. After receiving his form, the user can save it to their computer. The user then fills it out, and hits submit at some point when he has a connection to the server.

At 130, Step 4 shows Form Processing which is the result of user pressing submit on a form. The processing servlet receives the form. It pulls the RPM login information from the form, sets up a connection with RPM, and stores it in its session. At 132, the data processors named in the metadata XML are passed their respective chunks of XML from the form, as per the mapping in the metadata XML. At 134, the data going into each data provider is validated against its schema, also defined in the metadata XML. At 136, the data processors pull information they need to make the calls to RPM from the processing servlet's session through a generic context adapter and push the data from the form into RPM via its web service interface. At 138, the form processor passes the whole, original form to the form forwarding classes defined in the metadata XML (which store copies to a repository, or email a copy to somewhere, etc.).

As a matter of background, XForms store information in arbitrary XML blocks called instances. The system, method and framework of the present invention concerns itself mostly with handling the flow of these instances in and out of forms, and flexibly connecting with user interfaces people use to acquire and process forms. To implement the framework, the system, method and framework provide:

- Blank form templates for held by Form Template Generator 302 (FIG. 3);
- Data Providers 308 that pull information from the integrating application and produce an XML representation to be injected into the form;
- Data Processors 326 that translate XML data extracted from the form, and push it back into the integrating application;
- Result Providers 334 that encapsulate any errors or information messages in XML, for re-injection into an XForms instance (it is a Data Provider, but it's used in the processing step);
- A Context Adapter 310 that pulls information from the client interface on behalf of the Data Providers 308 and Data Processors 326;
- Generation and processing user interfaces 308 that serve and accept forms over some communication link;
- Optionally, XSD (XML Schema Definition) schema files that can be used to validate the format of data produced and processed by the Data Providers 308 and Data Processors 326;
- Optionally, a forwarding module that sends copies of the entire original form. (e.g., email persistent storage, other business process, etc.);
- A metadata file for each form that defines:
  - The connections between XForms instances and Data Providers 308 and Data Processors 326 (optionally including the XSD schema to validate the format of data during the transfer);
  - A Result Provider 334 to encapsulate any errors or information messages in XML, for re-injection into an XForms instance at Forms Repository 330;
  - Optionally, a module that will verify digital signatures in XFDL documents (Extensible Forms Description Language (XFDL) is a class of the Extensible Markup Language (XML) specified in World Wide Web Consortium (W3C) NOTE-XFDL-19980902, Extensible Forms Description Language (XFDL) 4.0, Sep. 2, 1998. XFDL is a high-level computer language that facilitates defining a form as a single, stand-alone object using XML elements and attributes. It offers precise control over form layout, permitting replacement of existing business/government forms in a human-readable, open standard. In addition to providing a syntax for in-line mathematical and conditional expressions, it allows the creator to include custom items, options, and external code functions. XFDL not only supports multiple digital signatures, but the signatures can apply to specific sections of a form and prevent changes to signed content; and
  - Optionally, any number of form forwarding modules.

A complete solution on the framework ends up layered as shown in FIG. 2, with the vast majority of the code and complexity encapsulated in the Generating and Processing Framework 208. The XForm Instance Extraction Library 210 simply extracts XForm data instances from the encapsulating presentation layer. In the preferred embodiment of the present invention, the presentation layer is XFDL, and the library is the IBM Workplace Forms™ API. (IBM Workplace Forms enables easy-to-use, open standards-based electronic forms (eForms) that help reduce inefficiencies inherent to paper-based forms. It provides organizations across many industries with security-rich electronic forms that adapt to existing resources and systems, simplify complex forms, enable business process automation, and help speed IT development.) More information on the IBM Lotus Workplace Forms product can be found here: http://www-142.ibm.com/software/workplace/products/product5.nsf/wdocs/formshome/. The Integrating Application API 212 is an access point to pull and push data from the application XForms are being integrated with. (In the present case, RPM's web services interface is utilized.) The Application Specific Form Generation and Processing Layer 206 is the result of attaching all the application-specific data extraction and injection code into the Generation and Processing Framework 208. The User Interfaces 202, 204 add fulfill requests to generate or process forms, either directly on the same machine or over a network over whatever protocol is appropriate. (In the preferred embodiment, a J2EE web application is utilized.)

The solution of the present invention is unique because:
It applies in general to most integration scenarios;
Each one of the components effectively stands alone, with little or no dependencies, promoting reuse, and making it easy to produce each component because of its confined scope;
It is extremely flexible;
Upstream, any type of client interfaces can be swapped in and out (the implementation of the preferred embodiment uses the same framework to power both a desktop application, and a web based interface);
Downstream, any implementing component can be swapped in and out, with no effect on the functionality of the framework, and little or no effect on any other component;
It supports versioning of forms, including concurrent processing of multiple versions of the same form without cross interference; and
Best practices that would most likely be skipped over in specific implementations are built into the framework. (e.g., component caching for performance).

Figure 3:
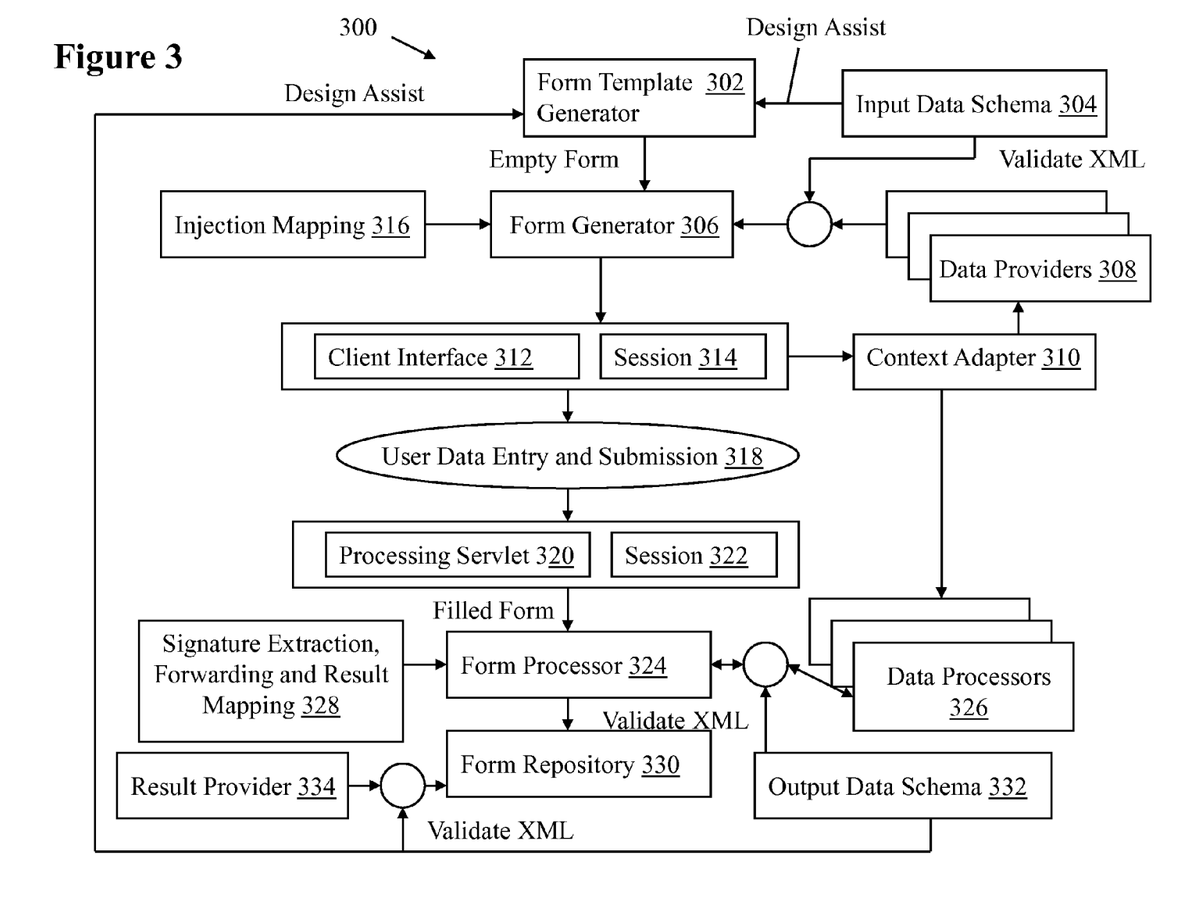
FIG. 3 depicts the system and method of the present invention.

FIG. 3 illustrates the system and method of the present invention 300. Blank form templates (previously created by developers) are provided to a Form Template Generator 302. Input Data Schema 304 provides design assist to the developers as does Output Data Schema 332 in a feedback loop. Data Providers 308 pull information from the integrating application and produce an XML representation to be injected into a Form Generator 306. Injection Mapping 316 provides mapping data to the Form Generator 306. User data to complete the form entered at User Entry and Submission 318 is processed by Processing Servlet 320 after a Session 322 has been established and the filled form is passed to the Form Processor 324. Data Processors 326 translate XML data extracted from the form, and push it back into the integrating application via Form Processor 324. Signature Extraction, Forwarding and Result Mapping 328 provides input to the Form Processor 324. Result Providers 334 encapsulate any errors or information messages in XML, for re-injection into an XForms instance at Forms Repository 330. A Context Adapter 310 pulls information from the Client Interface 312, after a Session 314 has been established, on behalf of the Data Providers 308 and Data Processors 326. Generation and processing user interfaces serve and accept forms over some communication link. Optionally, XSD schema files that can be used to validate the format of data produced and processed by the Data Providers 308 and Data Processors 326. Optionally, a forwarding module that sends copies of the entire original form (e.g., email, persistent storage, other business process, etc.). A metadata file for each form defines the connections between XForms instances and Data Providers 308 and Data Processors 326 (optionally including the XSD schema to validate the format of data during the transfer). A Result Provider 334 encapsulates any errors or information messages in XML, for re-injection into an XForms instance at Forms Repository 330. Optionally, a module verifies digital signatures in XFDL documents.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system comprising:
a set of computing devices for managing XForms documents by performing a method comprising:
receiving a request for an XForms form from a user;
generating a blank XForms form in response to the receiving, the generating including:
obtaining a stored form template corresponding to the requested XForms form in response to the receiving, the form template including template metadata extensible markup language (XML) data identifying a set of data providers corresponding to an XForms integrated application and template metadata XML data defining an XML schema;
acquiring application XML data from the XForms integrated application using at least one of the set of data providers;
validating the application XML data against the XML schema defined in the template metadata XML data of the form template; and
generating the blank XForms form by merging the validated application XML data with the form template; and
providing the blank XForms form for presentation to the user in response to the request for the XForms form.

2. The computer system of claim 1, the method further comprising:
obtaining authentication credentials for the user prior to the receiving; and
establishing a connection with the XForms integrated application in response to obtaining the authentication credentials.

3. The computer system of claim 1, the method further comprising:
receiving a submitted XForms form based on the blank XForms form, wherein the submitted XForms form includes form XML data and form metadata XML data defining a submitted XML schema; and
validating the form XML data against the submitted XML schema defined in the form metadata XML data in the submitted XForms form.

4. The computer system of claim 3, wherein the form metadata XML data further identifies a set of data processors corresponding to the XForms integrated application, the method further comprising providing form XML data from the submitted XForms form for processing by at least one of the set of data processors identified in the form metadata XML data in the submitted XForms form.

5. The computer system of claim 4, the method further comprising:
establishing a connection with the XForms integrated application in response to the receiving the submitted XForms form; and
providing the validated form XML data for processing by the XForms integrated application using the at least one of the set of data processors.

6. The computer system of claim 3, wherein the form metadata XML data further defines a set of form forwarding classes, the method further comprising providing the submitted XForms form for processing by at least one of the set of form forwarding classes defined in the form metadata XML data in the submitted XForms form.

7. The computer system of claim 6, wherein the set of form forwarding classes perform at least one of: providing a copy of the submitted XForms form for storage in a data repository or forwarding a copy of the submitted XForms form for use by another user.

8. A method of managing XForms documents, the method comprising:
receiving a request for an XForms form from a user on a computer system;
generating a blank XForms form in response to the receiving, the generating including:
obtaining a stored form template corresponding to the requested XForms form in response to the receiving, the form template including template metadata extensible markup language (XML) data identifying a set of data providers corresponding to an XForms integrated application and template metadata XML data defining an XML schema;
acquiring application XML data on the computer system from the XForms integrated application using at least one of the set of data providers;
validating the application XML data against the XML schema defined in the template metadata XML data of the form template using the computer system; and
generating the blank XForms form on the computer system by merging the validated application XML data with the form template; and
providing the blank XForms form for presentation to the user in response to the request for the XForms form.

9. The method of claim 8, further comprising:
receiving a submitted XForms form based on the blank XForms form, wherein the submitted XForms form includes form XML data and form metadata XML data defining a submitted XML schema; and
validating the form XML data against the submitted XML schema defined in the form metadata XML data in the submitted XForms form.

10. The method of claim 9, wherein the form metadata XML data identifies a set of data processors corresponding to the XForms integrated application, the method further comprising providing form XML data from the submitted XForms form for processing by at least one of the set of data processors identified in the form metadata XML data in the submitted XForms form.

11. The method of claim 10, further comprising:
establishing a connection with the XForms integrated application in response to the receiving the submitted XForms form; and
providing the validated form XML data for processing by the XForms integrated application using the at least one of the set of data processors.

12. The method of claim 9, wherein the form metadata XML data further defines a set of form forwarding classes, the method further comprising providing the submitted XForms form for processing by at least one of the set of form forwarding classes defined in the form metadata XML data in the submitted XForms form.

13. The method of claim 12, wherein the set of form forwarding classes perform at least one of: providing a copy of the submitted XForms form for storage in a data repository or forwarding a copy of the submitted XForms form for use by another user.

14. A non-transitory computer-readable storage medium storing program code, which when executed, enables a computer system to implement a method for managing XForms documents, the method comprising:
receiving a request for an XForms form from a user;
generating a blank XForms form in response to the receiving, the generating including:
obtaining a stored form template corresponding to the requested XForms form in response to the receiving, the form template including template metadata extensible markup language (XML) data identifying a set of data providers corresponding to an XForms integrated application and template metadata XML data defining an XML schema;
acquiring application XML data from the XForms integrated application using at least one of the set of data providers;
validating the application XML data against the XML schema defined in the template metadata XML data of the form template; and
generating the blank XForms form by merging the validated application XML data with the form template; and
providing the blank XForms form for presentation to the user in response to the request for the XForms form.

15. The computer-readable storage medium of claim 14, the method further comprising:
receiving a submitted XForms form based on the blank XForms form, wherein the submitted XForms form includes form XML data and form metadata XML data defining a submitted XML schema; and
validating the form XML data against the submitted XML schema defined in the form metadata XML data in the submitted XForms form.

16. The computer-readable storage medium of claim 15, wherein the form metadata XML data identifies a set of data processors corresponding to the XForms integrated application, the method further comprising providing form XML data from the submitted XForms form for processing by at least one of the set of data processors identified in the form metadata XML data in the submitted XForms form.

17. The computer-readable storage medium of claim 16, the method further comprising:
establishing a connection with the XForms integrated application in response to the receiving the submitted XForms form; and
providing the validated form XML data for processing by the XForms integrated application using the at least one of the set of data processors.

18. The computer-readable storage medium of claim 15, wherein the form metadata XML data defines a set of form forwarding classes, the method further comprising providing the submitted XForms form for processing by at least one of the set of form forwarding classes defined in the form metadata XML data in the submitted XForms form.

19. The computer-readable storage medium of claim 18, wherein the set of form forwarding classes perform at least one of: providing a copy of the submitted XForms form for storage in a data repository or forwarding a copy of the submitted XForms form for use by another user.

\* \* \* \* \*